Patented July 28, 1931

1,816,525

UNITED STATES PATENT OFFICE

RICHARD GUTENSOHN, OF FRANKFORT-HOCHST-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF WASHING GASES AND VAPORS

No Drawing. Application filed June 13, 1928, Serial No. 285,212, and in Germany June 29, 1927.

The present invention relates to a new process for washing gases and vapors.

In many branches of industry where gases and vapors have to be purified, the removal of impurities, particularly dusty admixtures, from the gases requires difficult and complicated operations, as the fine dry dust-particles are difficultly wetted even in intimate contact with the washing liquid, they are carried away from the liquid by the current of gas.

I have now found that even minute particles of dust are immediately wetted and retained by the washing liquid, if there is added to the latter a small percentage, for instance 0.1–0.2 per cent of a wetting agent, such as used in the textile industry. The quantitative proportion of the wetting agent to be used may vary, according to the particular conditions, between 0.05 and 1.0 per cent of the washing liquid. For the purpose in question there may be used with advantage aromatic, hydro-aromatic or higher aliphatic sulfonic acids or salts thereof; also mixed aromatic-aliphatic sulfonic acids, either alone or mixed with each other.

An organic solvent may be added, any of the usual solvents may be suitable for the purpose, in particular such as are capable of preventing the formation of froth, for instance tetrachlorethylene or the like. The quantity of the solvent is advantageously adjusted to the quantity of the wetting agent to be used, the preferred proportion varying between 5 per cent and 100 per cent. The dust particles are immediately wetted and retained by the washing liquid when they touch the surface of the liquid containing the wetting agent.

The rapid and complete removal of the impurities from the gases by use of the washing liquids containing a wetting agent of the kind referred to shortens the washing operation and allows of the same purifying effect being obtained with a less extensive and simpler apparatus and a smaller quantity of the washing liquid than that required by the complicated apparatuses and the tedious washing operations hitherto employed.

The following examples serve to illustrate my invention, but they are not intended to limit it thereto.

(1) In washing blast-furnace gases and, in general, gases which have to be purified in metallurgical works and foundries or in cokeries in the wet way, that is to say by water in wash-towers, trickling towers or the like, there is added to the washing liquid one to two grams per liter of sodium benzylnaphthalene-sulfonate.

(2) In the purification of roasting gas or flue gas, for instance $SO_2$, as it is practiced in organic chemicals works, there is added to the washing water in the wash towers one to two grams per liter of butylnaphthalene-sulfonic acid.

(3) In briquetting works the air, absorbed by a ventilator and which contains a great quantity of brown-coal flue-dust, is blown through a "Raschig" trickling-tower the trickling liquid for which consists of cold water to which there are added, per liter of the liquid, two to five grams of sodium isopropylnaphthalene-sulfonate and 0.5 to 2.5 grams of perchlorethylene.

My new process offers particular advantages where the washing liquid is to be used repeatedly in a cycle, because in such cases the smallest quantity of the wetting agent is consumed.

It is to be understood that the acids specified in the following claims are to comprise also the salts thereof.

I claim:

1. In a process for removing solid impurities from gases and vapors by treating them with a washing liquid, the improvement which comprises adding to the washing liquid an organic sulfonic acid.

2. In a process for removing solid impurities from gases and vapors by treating them with a washing liquid, the improvement which comprises adding to the washing liquid an aromatic sulfonic acid.

3. In a process for removing solid impurities from gases and vapors by treating them with a washing liquid, the improvement which comprises adding to the washing liquid butylnapthalene-sulfonic acid.

4. In a process for removing solid impurities from gases and vapors by treating them with a washing liquid, the improvement which comprises adding to the washing liquid one to two grams of butylnaphthalene-sulfonic acid per liter of the liquid.

5. In a process for removing solid impurities from gases and vapors by treating them with a washing liquid, the improvement which comprises adding to the washing liquid a wetting agent in combination with an organic solvent.

6. In a process for removing solid impurities from gases and vapors by treating them with a washing liquid, the improvement which comprises adding to the washing liquid a wetting agent in combination with tetra-chloro-ethylene.

7. In a process for removing solid impurities from gases and vapors by treating them with a washing liquid, the improvement which comprises adding to the washing liquid one to two grams of butylnaphthalene-sulfonic acid per liter of the liquid, and tetra-chloro-ethylene in the proportion of 20 to 60% of the wetting agent.

In testimony whereof, I affix my signature.

RICHARD GUTENSOHN.